United States Patent [19]
Davis

[11] Patent Number: 4,946,264
[45] Date of Patent: Aug. 7, 1990

[54] ELECTRO-OPTIC SIGNAL PROCESSING APPARATUS

[75] Inventor: Dennis W. Davis, Boca Raton, Fla.

[73] Assignee: United Technologies, Inc., Hartford, Conn.

[21] Appl. No.: 280,382

[22] Filed: Dec. 6, 1988

[51] Int. Cl.$^5$ .................................................. H01S 3/02
[52] U.S. Cl. .................................... 350/486; 350/487; 372/99
[58] Field of Search .......................... 332/7.51; 372/99; 369/101; 358/206, 208; 352/111, 112; 350/486, 487

[56] References Cited

U.S. PATENT DOCUMENTS

| | | | |
|---|---|---|---|
| 3,154,748 | 10/1964 | Javan et al. | 332/7.51 |
| 3,509,408 | 4/1970 | Myers et al. | 372/99 |
| 3,530,401 | 9/1970 | Garbuny et al. | 372/99 |
| 3,555,454 | 1/1971 | Myers et al. | 372/99 |
| 3,716,747 | 2/1973 | Patel | 315/10 |
| 4,528,524 | 7/1985 | Eden et al. | 332/7.51 |
| 4,544,898 | 10/1985 | Pernick | 332/7.51 |
| 4,717,893 | 1/1988 | Ooi | 332/7.51 |
| 4,794,296 | 12/1988 | Warde et al. | 350/356 |

OTHER PUBLICATIONS

Owechko et al., "Theoretical Resolution . . . Consideration", J. Opt. Soc. Am., vol. 1, #6, pp. 635–652, 6/84.
Pritchard, "A Reflex Electro-Optical Light Valve Television Display", RCA Review, Dec. 1969, pp. 567–692.
Casasent et al., "Dielectric and Optical Properties of Electron Beam–Addressed KD$_2$PO$_4$", Journal of the Optical Society of America, vol. 64, No. 12, Dec. 1974, pp. 1575–1581.
Schwartz et al., "Electron–Beam–Addressed Microchannel Spatial Light Modulator", Optical Engineering, Jan./Feb. 1985, vol. 24, No. 1, pp. 119–123.

Primary Examiner—Nelson Moskowitz
Attorney, Agent, or Firm—Perman & Green

[57] ABSTRACT

An input, high frequency signal is applied as a modulating input to a cavity positioned about the electron beam source of a traveling wave tube (TWT) amplifier. The TWT's electron beam is appropriately deflected, in a raster manner, over pixel areas of a KDP crystal plate. This action deposits, in each pixel area, charge which represents analog samples of the microwave waveform. The KDP crystal plate, together with an optical analyzer system, forms a Kerr cell modulator array. The charge deposited at the pixel sites causes associated variations in the index of refraction in the KDP crystal. When a reading beam of collimated, polarized light is raster scanned over the KDP plate, the angle of polarization of the beam is modified at each pixel site. The modified beam is reflected, passes through an analyzer section to a detector and then to a transmitter. By varying the rate of deflection of the reading beam and/or otherwise modifying the waveform produced by the beam, the characteristic of the received signal is modified for subsequent broadcast.

8 Claims, 2 Drawing Sheets

ELECTRO-OPTIC SIGNAL PROCESSING APPARATUS

FIELD OF THE INVENTION

This invention relates to signal processing apparatus and, more particularly, to signal processing apparatus adapted to modify the characteristics of a received signal and to retransmit the modified signal.

BACKGROUND OF THE INVENTION

In various signal processing applications, it is often desirable to modify certain characteristics of a received signal. Such characteristics may include the signal's time base, amplitude, frequency content, repetition rate, and the like. The art is replete with equipments capable of performing such modifications when a signal exhibits low bandwidth, low frequency characteristics. When however, wide bandwidth, high frequency signals are encountered, such equipment is not economically available. For instance, pulse signals in the X-band range, (e.g., approximately 10+ GigaHertz) are often encountered with 0.5 Gigahertz sidebands. Conventional circuits are not available, at reasonable expense, to modify the aforementioned characteristics of such signals.

The prior art discloses various electro-optic systems for processing high frequency signals. D. H. Pritchard in an article entitled "A Reflex Electro-Optic Light Valve Television Display" which appeared in the RCA Review, December 1969 at pages 567–692, describes a television system wherein a cathode ray tube has its mask and face plate replaced by an electro-optic crystal element on which is mounted a segmented mirror. As the tube's electron beam scans over the segmented mirror, charge is deposited on the various segments of the mirror in proportion to the beam's intensity. The front of the electro-optic crystal element is illuminated by a non-coherent light source which has been polarized in one direction. The crystal element modifies the polarization of the reflected light in accordance with the charge appearing on each of the various mirror segments. The beam, as thus modified, is passed through an analyzer and then projected onto a screen for viewing.

Another prior art system which employs an electro-optic crystal for signal processing is described in "Dielectric Optical Properties of Electron-Beam Addressed $KD_2PO_4$", Casasent et al, Journal of the Optical Society of America, Vol. 64, No. 12, Dec. 19, 1974, pages 1575–1581. The system described therein employs an electron-beam addressed KDP light valve wherein writing is accomplished via an electron gun on the target crystal. Read out occurs as the result of the crystal's modulation of light transmitted therethrough.

A further electro-optic light modulator is described by Schwartz et al in "Electron-Beam-Addressed Microchannel Spatial Light Modulator" appearing in "Optical Engineering, January/February 1985, VOl. 24, No. 1 at pages 119–123. In each of the aforementioned systems, the characteristics of an electro-optic crystal are employed to convert an electrical signal to an optical signal; however, there is no indication of any intention to modify or change the characteristics of the signal, but merely to faithfully reproduce it optically.

Accordingly, it is an object of this invention to employ an electro-optic system to enable modification of a received high frequency signal.

It is a further object of this invention to utilize an electro-optic system to segment an incoming signal so that its various portions can be independently operated upon.

SUMMARY OF THE INVENTION

The invention comprises an electro-optic signal processing system which receives an input signal, captures it and modifies its characteristics. The system includes means for generating a beam of energized particles; an optical target means which includes further means for temporarily storing a plurality of manifestations of the beam, each stored manifestation capable of modifying an optical property of the optical target means. Means are provided for modulating the energized particle beam in accordance with the characteristics of the input signal and directing the modulated particle beam to the optical target means. Means are provided to read the optical target means by directing a beam of collimated light onto the target means; sensing the reflections of the beam; and determining changes in the reflected beam which result from the interaction between the beam and the optical target and its modified optical properties. Further means are provided to modify the operation of the reading apparatus to enable the characteristics of the input signal to be altered.

DETAILED DESCRIPTION OF THE INVENTION

Figure 1:
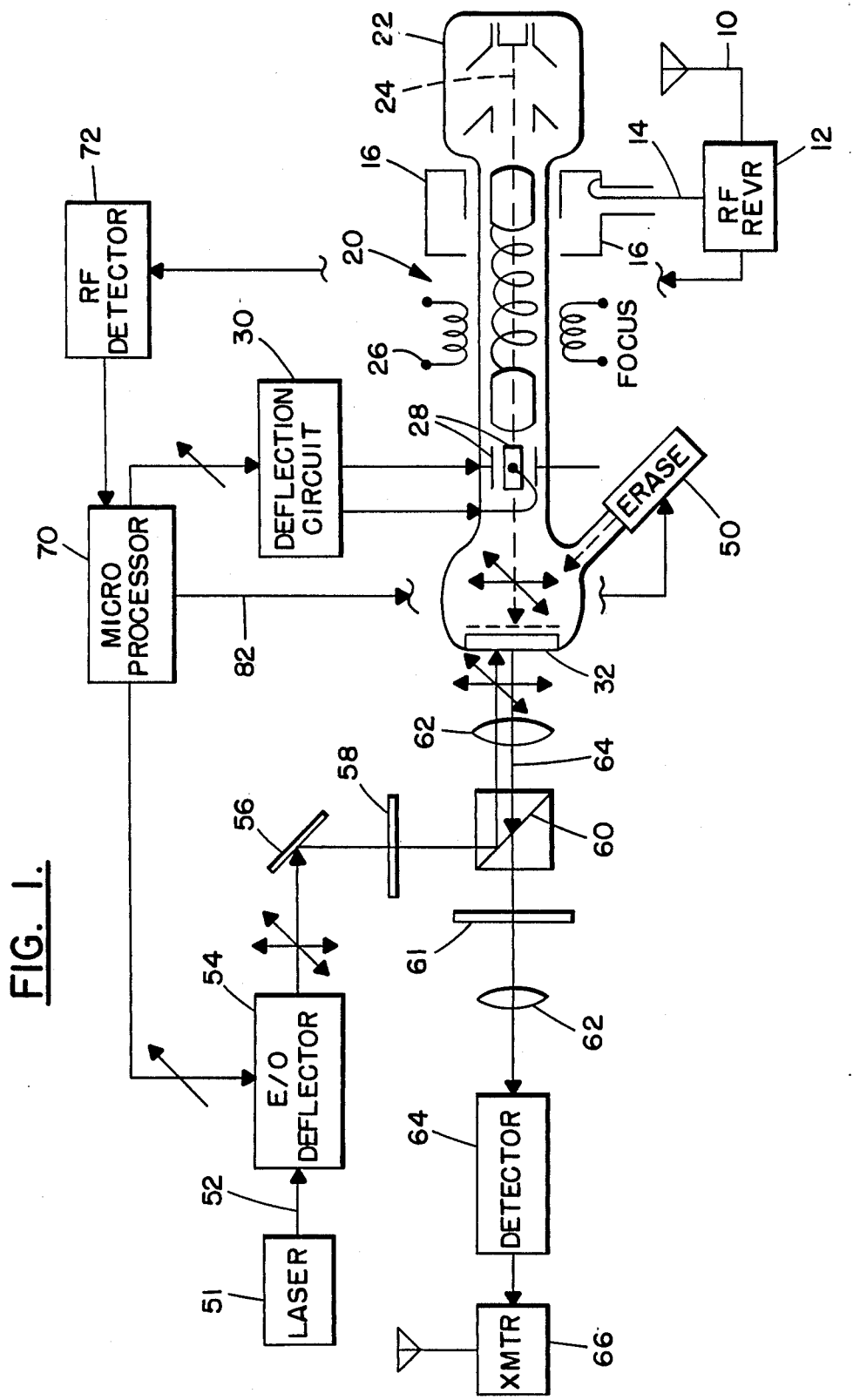
FIG. 1 is a block diagram/schematic of a circuit which embodies the invention.

The circuit of FIG. 1 essentially enables a received microwave or millimeter wave signal of a pulsed nature to be temporarily stored and to have its characteristics modified by an electro-optic reading beam. The input, high frequency signal is applied as a modulating input to a cavity positioned about the electron beam source of a traveling wave tube (TWT) amplifier. The TWT's electron beam is brought to a tight focus and appropriately deflected, in a raster manner, over pixel areas of a KDP crystal plate. This action deposits, in each pixel area, charge which represents analog samples of the pulse waveform. The KDP crystal plate, together with an optical analyzer system, forms a Kerr cell modulator array. The charge deposited at the pixel sites causes associated variations in the index of refraction in the KDP crystal. When a reading beam of collimated, polarized light is raster-scanned over the KDP plate, the angle of polarization of the beam is modified at each pixel site in accordance with the KDP plate's index of refraction. The modified beam is reflected; passes through an analyzer section to a detector and then to a transmitter. By varying the rate of deflection of the reading beam and/or otherwise modifying the waveform produced by the beam, the characteristics of the received signal can be modified and then rebroadcast in the modified form.

Referring now to FIG. 1, the details of the above-mentioned system will be described. A high frequency microwave or millimeter wave signal is detected at antenna 10 and fed via receiver 12 to microwave feed line 14. Feed line 14 enters a cavity 16 which surrounds the neck of the electron-beam generating portion of TWT 20. As is common in TWT's, the beam generating portion 22 provides a continuous electron-beam 24 of known current density. As the received signal is applied via input line 14, however, the current density of beam 24 is accordingly modulated in accordance with the waveform seen in cavity 16. This action causes the charge density of beam 24 to be modulated in accordance with the waveform.

As the modulated electron beam travels to the left, it is focused by focus coils 26 and passes through deflection plates 28. A deflection circuit 30 applies deflection voltages to both the vertical and horizontal deflection plates 28 so as to enable beam 24 to be raster scanned over an electro-optic storage plate 32. The structure to the right of deflection plates 28 is substantially conventional in TWT's; however, the structure to the left of deflection plates 28 to electro-optic plate 32 is not conventional and forms a part of this invention.

Figure 2:
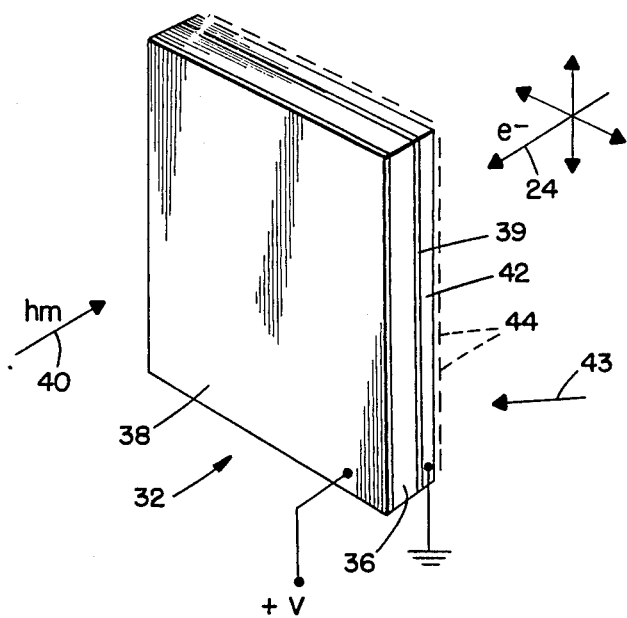
FIG. 2 is an isometric view of an electro-optic plate which forms a portion of the invention.
Figure 3:
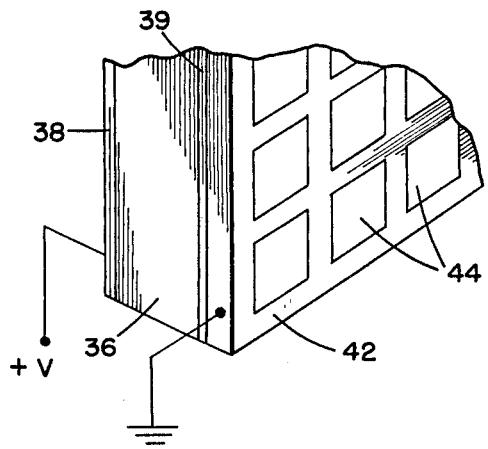
FIG. 3 is a partial additional isometric view of the electro-optic plate shown in FIG. 2.

Referring to FIGS. 2 and 3, the structure of electro-optic plate 32 is shown in detail. While other electro-optic crystals are suitable, it is preferred that the central element of electro-optic plate 32 be a single crystal plate 36 of potassium dideuterium phosphate ($KD_2PO_4$) As is well known, a KDP crystal exhibits a linear electro-optic effect when an electric field is applied across it. The electric field, when applied in the direction of the thickness of the crystal, modifies its index of refraction. When polarized light passes through the crystal, an induced berefringence modifies the light's polarization. A "crossed" analyzer will enable the modulation of reflected light, to be detected by selecting the orthogonal direction of polarization.

A transparent conductive coating 38 is applied to one side of electro-optic plate 36 and enables a potential V to be applied thereto. Coating 38 is preferably comprised of Indium Tin Oxide which provides the desired levels of conductivity and transparency. A mirrored surface 39 is applied to the opposite side of electro-optic plate 36 and serves to reflect any light beam coming from the direction shown by arrow 40. A layer of photoconductor 42 abuts the rear of mirror surface 39 and is connected, along its periphery, to a reference potential (e.g., ground).

As is shown in FIG. 3 (a partial isometric taken from the direction indicated by arrow 43 in FIG. 2), a segmented, transparent electrode structure 44 is deposited on the surface of photoconductor 42, opposite to mirror surface 39. Each electrode segment retains a charge when an electron-beam impinges thereupon. The level of the charge is dependent upon the time of residence of the electron beam on the segment and the level of modulation of the beam. The charge on each segment modifies the voltage seen across electro-optic plate 36 in the immediate vicinity of the segment and thereby causes a local change in the index of refraction in the manner above discussed. A preferred electrode structure includes an array of $1,000 \times 1,000$ segments ($10^6$ individual electrode segments).

The rate of scan of beam 24 across the $10^6$ segments is preferably synchronized such that an entire pulse width (as modulated on beam 24) appears as individual charge packets across electrode structure 44. Then, by raster scanning a laser beam 40 across the face of electro-optic plate 32, the return reflection is appropriately modulated with $10^6$ samples of the wave shape. By modifying the rate of scan of beam 40, the time base of the waveform stored by electrode structure 44 can be either lengthened or shortened as desired. Additionally, the rate of scan of beam 40 may be modified, during the scan, so that various portions of the signal waveform are lengthened or shortened, while others are modified in a different manner.

Furthermore, by adjusting the interval between scans, the pulse repetition rate can be altered.

Eventually, the stored charges on electrode segments 44 will dissipate and no longer collectively reflect the signal waveform. However, long before that, it is desirable to discharge the segments so that another cycle can be accomplished. This is achieved by causing photoconductor 42, which is normally non-conductive, to be rendered highly conductive to provide a discharge path. A preferred manner for rendering photo conductor 42 highly conductive is via the application of a high intensity light pulse from a flash lamp. Since each of electrode segments 44 is transparent, the photoconductor regions immediately thereunder are rendered conductive by the flash lamp and serve as a low resistance path to ground. This function is schematically shown as the erase function at 50 in FIG. 1. Erase 50 can further be a laser which can be scanned across photo conductor 42 at a controlled rate.

As further shown in FIG. 1, the optical read circuit includes laser 51 which generates a beam 52 directed towards electro-optic deflector 54. Deflector 54 operates on beam 52 to cause it to assume a raster scan pattern. Electro-optic deflector 54 may be any of a number of types of deflectors depending upon the demand of the signal processor. One appropriate deflector is a wide bandwidth acousto-optic Bragg cell such as produced by ISOMET, Inc., 5263 Port Royal Road, Springfield, Va. 22151. More stringent deflection requirements may call for the use of a chirped dye-laser combined with a vertical electro-optic deflector followed by a grating which provides horizontal deflection. Such a system is disclosed in "Configurations For Photo Refractive Laser Beam Steering" by Henshaw, SPIE, Vol. 464, Solid State Optical Control Devices, (1984), pages 21-28.

This scanned beam from deflector 54 is reflected by mirror 56 and directed through polarizing plate 58. Plate 58 (and analyzer plate 60) are orthogonally polarized in the well known manner.

After beam 52 passes through polarizing plate 58, it is reflected by half mirror surface 60, passes through lens 62 and scans electro-optic plate 32. As above mentioned, plate 32, in the vicinity of each electrode segment, modifies the incident beam's angle of polarization in accordance with the stored charge. The modified beam is reflected by mirror 39, emerges as beam 64, passes through half mirror surface 60, analyzer plate 61, lens 62 and impinges upon detector 64. The amplitude modulations of beam 64, which are created as a result of its passage through analyzer plate 61, are detected and fed to transmitter 66 for retransmission.

RF receiver 12 also provides synchronizing input to micro- processor 70 rf detector 72. In operation, microprocessor 70, upon detecting the commencement of a pulse from rf detector 72, synchronizes the operation of deflection circuit 30 therewith so that one entire scan of beam 24 across electrode segments 44 encompasses a full received pulse width. Then, by altering the deflection rate of electro-optic deflector 54, the time base of the sampled signal is modified and fed to transmitter 66 for retransmission. Microprocessor 70, via line 82, also controls the operation of erase circuit 50. It should be noted that delays on the order of microseconds to milliseconds may be achieved by the electro-optic crystal itself.

In summary, what has been described is a circuit which enables a received high frequency signal to be converted into a modulated electron-beam, which beam is sampled and stored (temporarily) in an electrode structure associated with an electro-optic plate. The electro-optic plate is subsequently optically interrogated with optical interrogation system being controllable to modify various aspects of the stored signal's time base, amplitude or other characteristics.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. An electro-optic signal processing apparatus comprising:
   means for generating an electron beam;
   optical target means including means for temporarily storing a plurality of manifestations of said beam, each said stored manifestation modifying an optical property of said optical target means;
   means for modulating said beam in accordance with the characteristics of a received high frequency signal and scanning said modulated beam across said optical target means;
   means for scanning a beam of collimated light over said optical target means and sensing reflections thereof which result from the interaction between said beam of light and said optical target means and its modified optical properties; and
   means for controlling the operation of said collimated light beam scanning means so as to alter a characteristic of said signal waveform.

2. The invention as defined in claim 1 wherein said optical target means includes crystal means and a plurality of charge accumulation areas associated therewith, each said charge accumulation area adapted, when charged, to modify the optical property of an associated area of said crystal means.

3. The invention as defined in claim 2 wherein said optical target means includes means for periodically discharging said charge accumulation means.

4. The invention as defined in claim 3 wherein said modulation means alters the intensity of said electron beam in accordance with said high frequency signal and moves said altered electron-beam across said charge accumulation areas to emplace a charge on each said charge accumulation area proportional to the intensity of said beam and the time said beam interacts with said charge accumulation areas.

5. The invention as defined in claim 4 wherein said discharge means is a photoconductive layer disposed between said charge accumulation means and said crystal means, said invention further comprising:
   light means for rendering conductive said photoconductive layer.

6. The invention as defined in claim 5 wherein said crystal means responds to an applied voltage by modifying its index of refraction and altering the polarization of a collimated beam of light which impinges thereon.

7. The invention as defined in claim 6 wherein said scanning means comprises:
   means for directionally polarizing said beam of collimated light; and
   means for traversing said polarized beam over said crystal means in the regions affected by said charge accumulation means, whereby the polarization of said light beam is successively altered by said crystal means in proportion to the charge resident on said charge accumulation means.

8. The invention as defined in claim 7 wherein said controlling means modifies the rate of traversal of said polarized beam so as to change the time base of said signal waveform.

* * * * *